United States Patent

(12) United States Patent
Kitaguchi

(10) Patent No.: US 9,550,477 B2
(45) Date of Patent: Jan. 24, 2017

(54) VEHICLE PEDAL DEVICE

(71) Applicant: Kazuaki Kitaguchi, Toyota (JP)

(72) Inventor: Kazuaki Kitaguchi, Toyota (JP)

(73) Assignee: TOYODA IRON WORKS CO., LTD., Toyota-shi (JP)

( * ) Notice: Subject to any disclaimer, the term of this patent is extended or adjusted under 35 U.S.C. 154(b) by 84 days.

(21) Appl. No.: 14/651,372

(22) PCT Filed: Apr. 1, 2013

(86) PCT No.: PCT/JP2013/060010
§ 371 (c)(1),
(2) Date: Jun. 11, 2015

(87) PCT Pub. No.: WO2014/091775
PCT Pub. Date: Jun. 19, 2014

(65) Prior Publication Data
US 2015/0329089 A1    Nov. 19, 2015

(30) Foreign Application Priority Data

Dec. 14, 2012  (JP) ................................. 2012-274119

(51) Int. Cl.
*G05G 1/30* (2008.04)
*B60T 7/06* (2006.01)
*G05G 1/32* (2008.04)

(52) U.S. Cl.
CPC ................ *B60T 7/065* (2013.01); *G05G 1/32* (2013.01); *G05G 1/30* (2013.01); *Y10T 74/20528* (2015.01)

(58) Field of Classification Search
CPC ............. B60T 7/065; G05G 1/30; G05G 1/32; Y10T 74/28; Y10T 74/2016
See application file for complete search history.

(56) References Cited

U.S. PATENT DOCUMENTS

| 6,070,488 A | 6/2000 | Yabusaki et al. |
| 6,880,665 B2 * | 4/2005 | Oprisch ................... B60T 7/065 180/274 |
| 7,090,046 B2 * | 8/2006 | Nebuya .................... B60R 21/09 180/274 |

FOREIGN PATENT DOCUMENTS

| JP | S59-77614 U | 5/1984 |
| JP | H05-42721 U | 6/1993 |

(Continued)

OTHER PUBLICATIONS

Sep. 29, 2015 Office Action issued in Japanese Patent Application No. 2012-274119.

(Continued)

*Primary Examiner* — Thomas Diaz
(74) *Attorney, Agent, or Firm* — Oliff PLC

(57) ABSTRACT

A vehicle pedal device includes a main bracket with a pair of side plates supporting a pedal and attached to a dash panel, and a sub-bracket coupling a main bracket rear end and reinforcement. Where both ends of a clinching pin inserted through coupling holes formed in side plate rear ends are inserted through insertion holes of sub-bracket side plate portions, the both ends are axially clinchingly compressed, whereby the rear ends are clinchingly attached to the portions to be overlapped, inner peripheral edges of the coupling and insertion holes having a non-circular shape, distances from their centers circumferentially varying, the portions being extended outward to be separated further away from the side plates toward the panel, and the insertion holes formed in the portions having an elongated hole shape whose length allows the both ends protruding from the side plates to pass therethrough where the portions are extended outward.

3 Claims, 15 Drawing Sheets

(56) References Cited

FOREIGN PATENT DOCUMENTS

| | | |
|---|---|---|
| JP | H10324228 A | 12/1998 |
| JP | H11-115699 A | 4/1999 |
| JP | 2001-138878 A | 5/2001 |
| JP | 2006-009896 A | 1/2006 |

OTHER PUBLICATIONS

Jul. 2, 2013 International Search Report issued in International Patent Application No. PCT/JP2013/060010.

* cited by examiner

VEHICLE PEDAL DEVICE

TECHNICAL FIELD

The present invention relates to vehicle pedal devices, and more particularly to a technique of attaching a main bracket to a sub-bracket by clinching in a vehicle pedal device including the main bracket attached to a dash panel and the sub-bracket that couples the main bracket and an instrument panel reinforcement.

BACKGROUND ART

A vehicle pedal device including a main bracket that has a pair of side plates pivotally supporting a pedal and that is attached to a dash panel, and a sub-bracket that couples the rear end of the main bracket and an instrument panel reinforcement is known as one type of vehicle pedal devices such as, e.g., a brake pedal device and an accelerator pedal device. An example of such a vehicle pedal device is shown in Patent Document 1. In Patent Document 1, a shaft portion of a bolt is inserted through coupling holes formed in the rear ends of the pair of side plates of the main bracket and insertion holes formed in front ends of a pair of side plate portions of the sub-bracket, and the main bracket is fastened to the sub-bracket with nuts such that the pair of side plates overlap the pair of side plate portions.

PRIOR ART DOCUMENTS

Patent Documents

Patent Document 1: Japanese Patent Application Publication No. H11-115699
Patent Document 2: Japanese Utility Model Application Publication No. S59-77614

SUMMARY OF THE INVENTION

Problem to be Solved by the Invention

In the vehicle pedal device of Patent Document 1, the main bracket is fastened to the sub-bracket with the bolt and nuts, which increases the number of parts and assembly time. Patent Document 2 describes that a release pedal lever is fixed to a cover by clinching both ends of a pin that couples the release pedal lever and the cover. Based on the technique of Patent Document 2, the above problem can be solved by using a clinching pin instead of the bolt and nuts used in Patent Document 1 and attaching the main bracket to the sub-bracket by clinching.

In such vehicle pedal devices, however, in the case of a fastening structure using the bolt and nuts, a relatively large force (axial force) is generated in the axial direction of the bolt. Accordingly, if the sub-bracket attempts to pivot with respect to the main bracket about the bolt due to, e.g., an external force, the pivoting of the sub-bracket is prevented by a relatively large frictional force. In the case of the clinching, however, a force (axial force) that is generated in the axial direction of the clinching pin is relatively small as compared to the case of the bolt and nuts. Accordingly, the sub-bracket may easily pivot with respect to the main bracket about the clinching pin by a relatively light load.

The present invention was developed in view of the above circumstance, and it is an object of the present invention to provide a vehicle pedal device capable of suppressing an increase in the number of parts and an increase in assembly time as compared to conventional examples and capable of preventing a sub-bracket from easily pivoting with respect to a main bracket.

Means for Solving the Problem

To achieve the object, the present invention provides a vehicle pedal device, (a) which includes a main bracket that comprises a pair of side plates pivotally supporting a pedal and that is attached to a dash panel, and a sub-bracket that couples a rear end of the main bracket and an instrument panel reinforcement, and (b) in which in a state where both ends of a clinching pin inserted through coupling holes formed in rear ends of the pair of side plates are inserted through insertion holes formed in front ends of a pair of side plate portions of the sub-bracket, the both ends of the clinching pin are compressed in an axial direction by clinching, whereby the rear ends of the pair of side plates are attached to the pair of side plate portions of the sub-bracket by the clinching such that the pair of side plate portions of the sub-bracket overlap the rear ends of the pair of side plates, the vehicle pedal device characterized in that (c) inner peripheral edges of the coupling holes and the insertion holes have such a non-circular shape that distances from centers of the coupling holes and the insertion holes vary in one circumferential direction about the centers.

Effects of the Invention

According to the vehicle pedal device of the present invention, the inner peripheral edges of the coupling holes and the insertion holes have such a non-circular shape that the distances from the centers of the coupling holes and the insertion holes vary in one circumferential direction about the centers. Accordingly, when both ends of the clinching pin are compressed in the axial direction of the clinching pin by clinching in the state where the both ends of the clinching pin inserted through the coupling holes are inserted through the insertion holes, the both ends of the clinching pin expand toward the inner peripheral surfaces of the coupling holes and the insertion holes each having the non-circular shape at the inner peripheral edges. The inner peripheral surfaces of the coupling holes and the insertion holes therefore serve as stoppers that stop turning of the sub-bracket with respect to the main bracket about the clinching pin. The sub-bracket can thus be prevented from easily turning with respect to the main bracket by a relatively light load. Since the pair of side plates of the main bracket are attached to the pair of side plate portions of the sub-bracket by clinching of the clinching pin, an increase in the number of parts and an increase in assembly time can be suppressed as compared to conventional vehicle pedal devices in which a pair of side plates of a main bracket are fastened to a pair of side plate portions of a sub-bracket with a bolt and nuts.

Preferably, the vehicle pedal device of the present invention, characterized in that the pair of side plate portions are extended outward so as to be separated further away from the pair of side plates toward the dash panel, and the insertion holes formed in the pair of side plate portions have a shape of an elongated hole having such a length that allows the both ends of the clinching pin which protrude from the pair of side plates to pass therethrough in the state where the pair of side plate portions are extended outward. Accordingly, the both ends of the clinching pin can be inserted through the insertion holes of the sub-bracket by moving the front ends of the sub-bracket toward the both ends of the clinching pin inserted through the coupling holes of the main bracket. This can improve workability in attaching the sub-bracket to the main bracket.

More preferably, the vehicle pedal device of the present invention, characterized in that the clinching pin turnably supports a pivot lever that, when the dash panel moves backward and the sub-bracket is caused to pivot with respect to the main bracket about the clinching pin, pivots together with the sub-bracket to cause the pedal to pivot in a direction in which the pedal is operated. Accordingly, if the dash panel moves backward, the main bracket and the sub-bracket are folded about the clinching pin. The brake pedal device can thus have the backward movement preventing capability to prevent a stepping portion of the pedal from moving backward toward a driver's seat.

More preferably, the vehicle pedal device of the present invention, characterized in that a rear end of the sub-bracket is located higher than the insertion holes formed in the front ends of the sub-bracket. This allows the sub-bracket to pivot with respect to the main bracket about the clinching pin in a preferable manner if the dash panel moves backward.

More preferably, the coupling hole and the insertion hole have polygonal shapes. Accordingly, a load that causes the sub-bracket to pivot with respect to the main bracket about the clinching pin can be set by adjusting the number of vertices of the shape of the coupling holes and the insertion holes as appropriate.

MODES FOR CARRYING OUT THE INVENTION

An embodiment of the present invention will be described in detail below with reference to the accompanying drawings. In order to facilitate understanding, the figures in the following embodiments are shown simplified or deformed as appropriate, and each part is not necessarily drawn at an accurate dimensional ratio, in an accurate shape, etc.

First Embodiment

Figure 1:
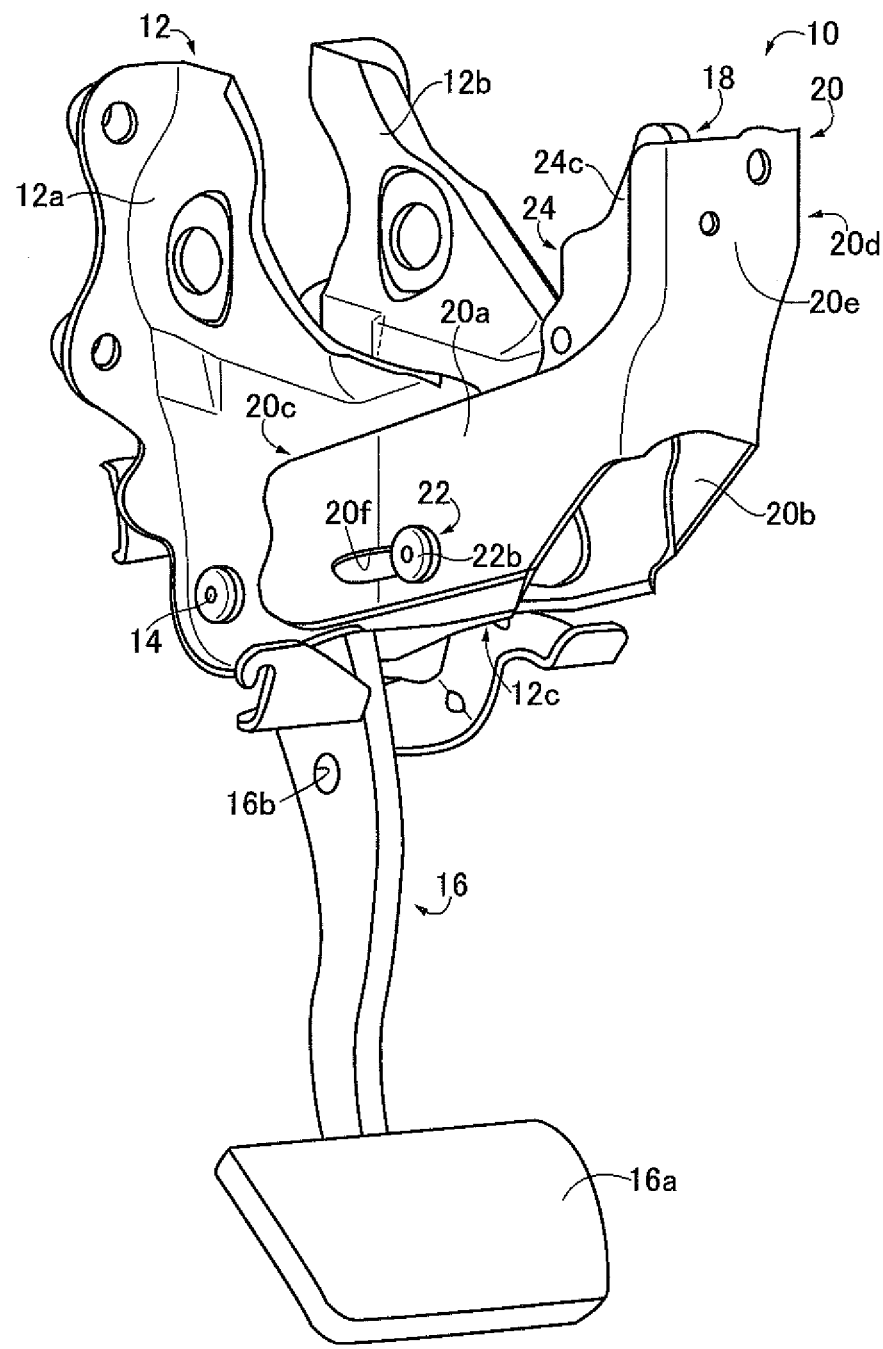
FIG. 1 is a perspective view showing a brake pedal device to which the present invention is applied.
Figure 2:
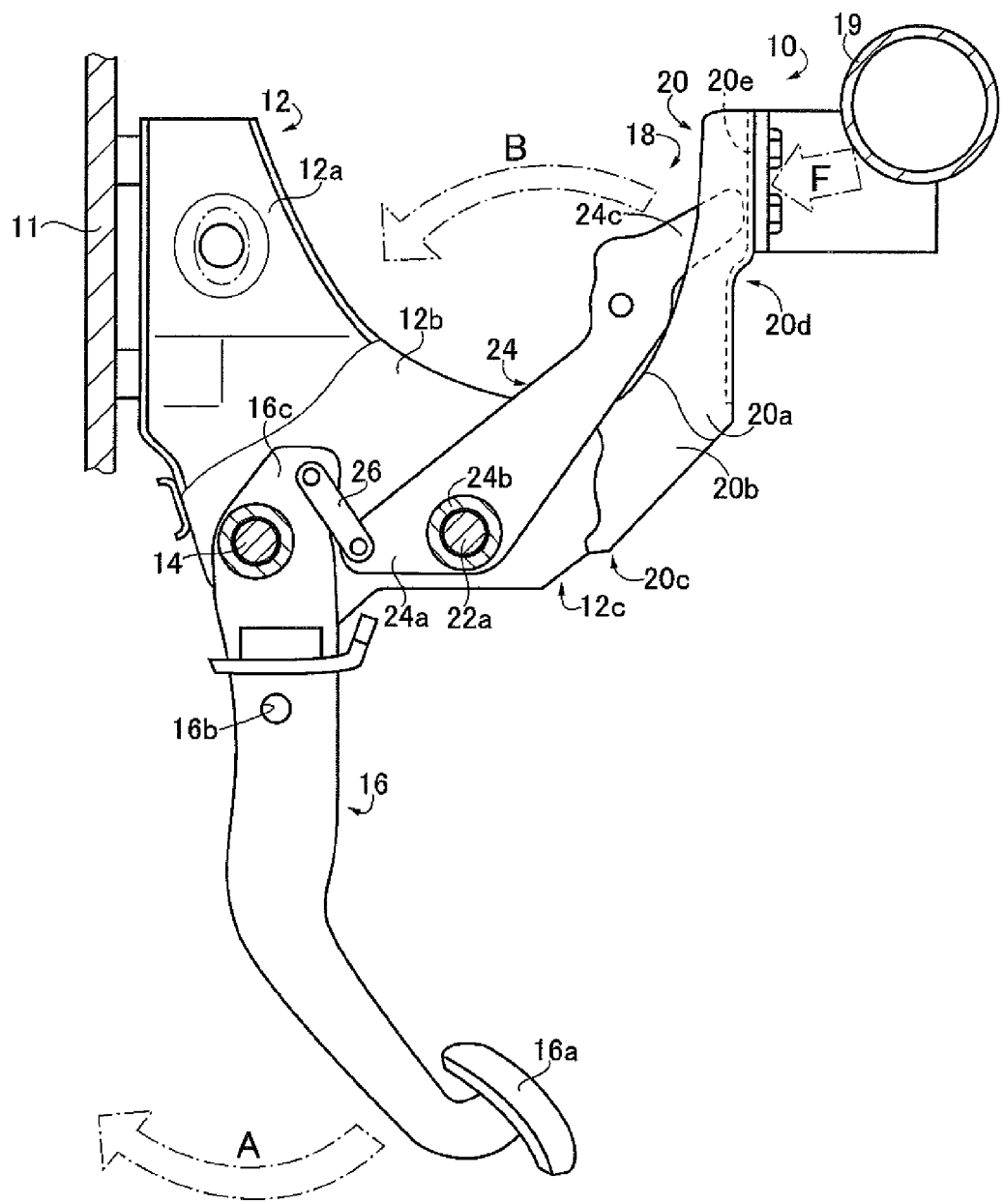
FIG. 2 is a view showing a backward movement preventing mechanism included in the brake pedal device of FIG. 1.

FIGS. 1 and 2 are a perspective view and a front view showing a brake pedal device (vehicle pedal device) 10 for a service brake to which the present invention is applied. As shown in FIGS. 1 and 2, the brake pedal device 10 includes:

a main bracket 12 that is attached to a dash panel 11 separating an engine compartment from a passenger compartment and that has a pair of plate-shaped side plates 12a, 12b facing each other; a first clinching pin 14 having a stepped columnar shape and having its both ends clinched so that the first clinching pin 14 is fixed between the pair of side plates 12a, 12b; a brake pedal (pedal) 16 having the shape of a longitudinal flat plate and pivotally supported by the first clinching pin 14; and a stepping portion 16a that is formed integrally with the brake pedal 16 at the end on the opposite side of the brake pedal 16 from the first clinching pin 14 side and that is depressed when a driver performs a braking operation. An operating rod, not shown, which protrudes from a brake booster into the passenger compartment is coupled via a clevis to an attachment hole 16b formed at an intermediate position in the brake pedal 16.

Accordingly, as shown in FIG. 2, when the driver depresses the stepping portion 16a of the brake pedal 16 by the braking operation and the brake pedal 16 pivots in the direction shown by an arrow A about the first clinching pin 14, the operating rod is mechanically pressed according to the pivoting of the brake pedal 16. A brake oil pressure according to the depressing operation force applied to the brake pedal 16 is thus generated from a master cylinder, not shown.

The brake pedal device 10 includes a backward movement preventing mechanism 18 that prevents the stepping portion 16a of the brake pedal 16 from moving backward toward a driver's seat even if the dash panel 11 moves backward toward the driver's seat by, e.g., a load applied from the front of a vehicle due to a collision etc.

As shown in FIG. 2, the backward movement preventing mechanism 18 includes: a sub-bracket 20 that has a pair of side plate portions 20a, 20b having the shape of a longitudinal flat plate and facing each other and a coupling plate portion 20e coupling rear ends 20d of the side plate portions 20a, 20b so that the sub-bracket 20 has a U-shaped section or an angled U-shaped section, and that couples an end on the opposite side of the main bracket 12 from the dash panel 11 side, namely rear ends 12c, and an instrument panel reinforcement 19; a second clinching pin (clinching pin) 22 with which ends on the dash panel 11 side of the pair of side plate portions 20a, 20b, namely front ends 20c, are attached to the rear ends 12c of the pair of side plates 12a, 12b of the main bracket 12 by clinching such that the front ends 20c overlap the rear ends 12c; a pivot lever 24 having the shape of a longitudinal flat plate and pivotally supported by the second clinching pin 22; and a pair of coupling links 26 that are provided on both sides (the front and back sides of FIG. 2) of the brake pedal 16 and the pivot lever 24 so as to extend between a base portion 24a of the pivot lever 24 on the second clinching pin 22 side and an end 16c of the brake pedal 16 on the first clinching pin 14 side and to sandwich the end 16c and the base portion 24a therebetween. A cylindrical portion 24b having a cylindrical shape is fixedly fitted to the base portion 24a of the pivot lever 24, and a bearing 28 (see FIGS. 5 and 6) such as, e.g., a metal bearing is interposed between the inner peripheral surface of the cylindrical portion 24b and the outer peripheral surface of the second clinching pin 22 in order to reduce sliding resistance between the cylindrical portion 24b and the second clinching pin 22. In FIG. 2, one of the side plates of the main bracket 12 which is located closer to the viewer, namely the side plate 12a, is shown partially cutaway to reveal the coupling structure between the brake pedal 16 and the pivot lever 24 with the pair of coupling links 26.

Figure 3:
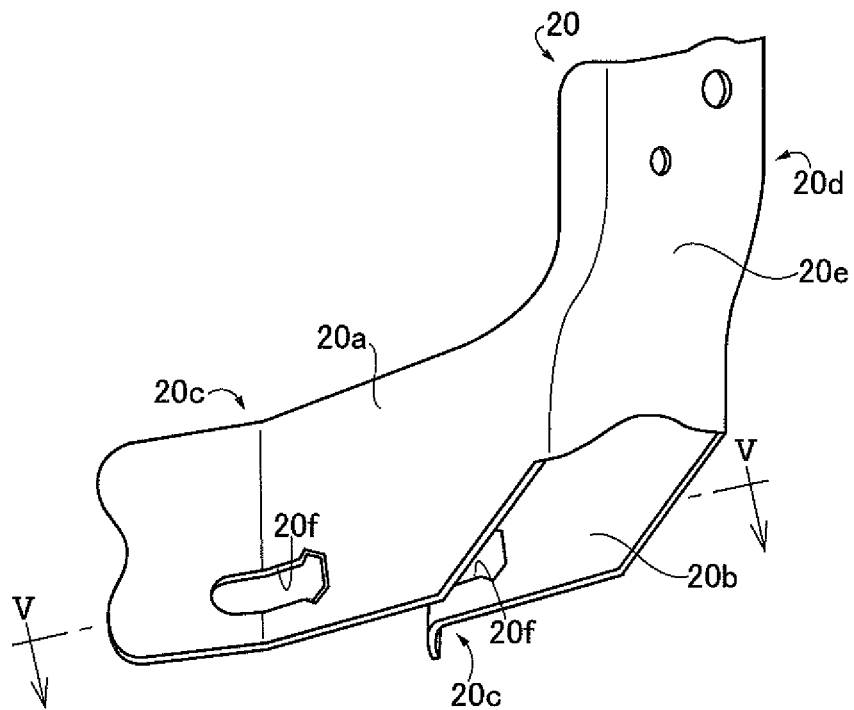
FIG. 3 is a perspective view showing a sub-bracket included in the brake pedal device of FIG. 1.

As shown in FIG. 3, the coupling plate portion 20e of the sub-bracket 20 is attached to the instrument panel reinforcement 19, and an insertion hole 20f is formed in each of the front ends 20c of the pair of side plate portions 20a, 20b. A coupling hole 12d (see FIGS. 5 to 7) is formed in each of the rear ends 12c of the pair of side plates 12a, 12b of the main bracket 12.

Figure 4:
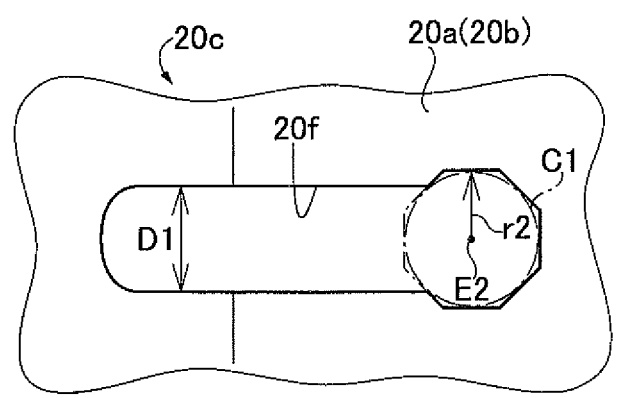
FIG. 4 is a view showing an insertion hole having the shape of an elongated hole formed in the sub-bracket of FIG. 3.
Figure 7:
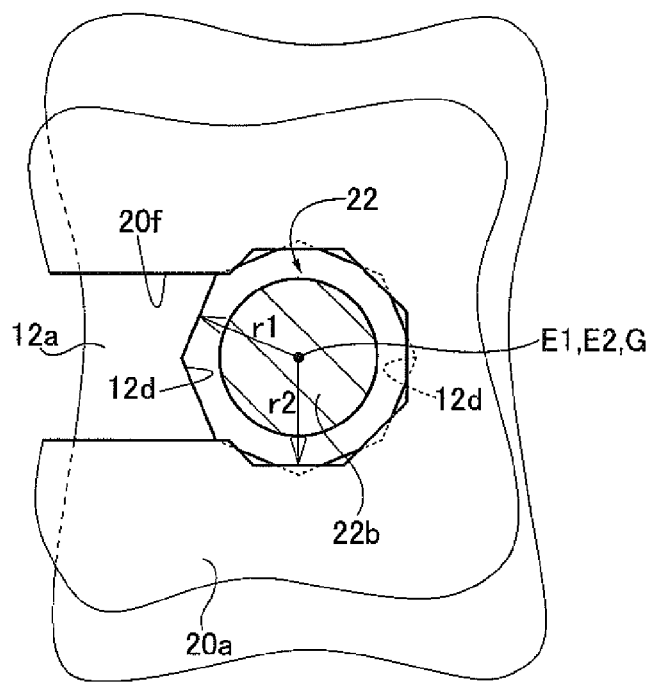
FIG. 7 is a cross sectional view taken along line VII-VII of FIG. 5.

As shown in FIGS. 3 and 4, each of the insertion holes 20f of the sub-bracket 20 is an elongated hole extending substantially in the same direction as the longitudinal direction of the side plate portions 20a, 20b, namely in the direction toward the dash panel 11. The end on the rear end 20d side of the insertion hole 20f having the shape of an elongated hole has an octagonal shape (polygonal shape), and the inscribed circle C1 of the octagon has a diameter larger than the lateral dimension D1 of the insertion hole 20f other than the end on the rear end 20d side. As shown in FIG. 7, each of the coupling holes 12d of the main bracket 12 has an octagonal shape (polygonal shape). The polygonal shapes of the coupling hole 12d and the end of the insertion hole 20f are experimentally determined in advance so that the main bracket 12 and the sub-bracket 20 can turn relative to each other about the second clinching pin 22 when subjected to an impact load. The end on the rear end 20d side of the insertion hole 20f having the shape of an elongated hole has substantially the same diameter as the coupling hole 12d. As shown in FIGS. 4 and 7, the inner peripheral edges of the octagonal coupling hole 12d and the octagonal insertion hole 20f have such a non-circular shape that the distances r1, r2 from the centers E1, E2 of the octagonal coupling hole 12d and the octagonal insertion hole 20f vary periodically in one circumferential direction about the centers E1, E2. As shown in FIG. 7, the center E1 of the octagonal coupling hole 12d matches the center E2 of the octagonal insertion hole 20f in the present embodiment. As shown in FIG. 7, the coupling hole 12d and the insertion hole 20f are formed in the side plates 12a, 12b and the side plate portions 20a, 20b so that the vertices of the octagonal shape of the coupling hole 12d do not match the vertices of the octagonal shape of the insertion hole 20f in the state where the front ends 20c of the pair of side plate portions 20a, 20b of the sub-bracket 20 overlap the rear ends 12c of the pair of side plates 12a, 12b of the main bracket 12.

Figure 5:
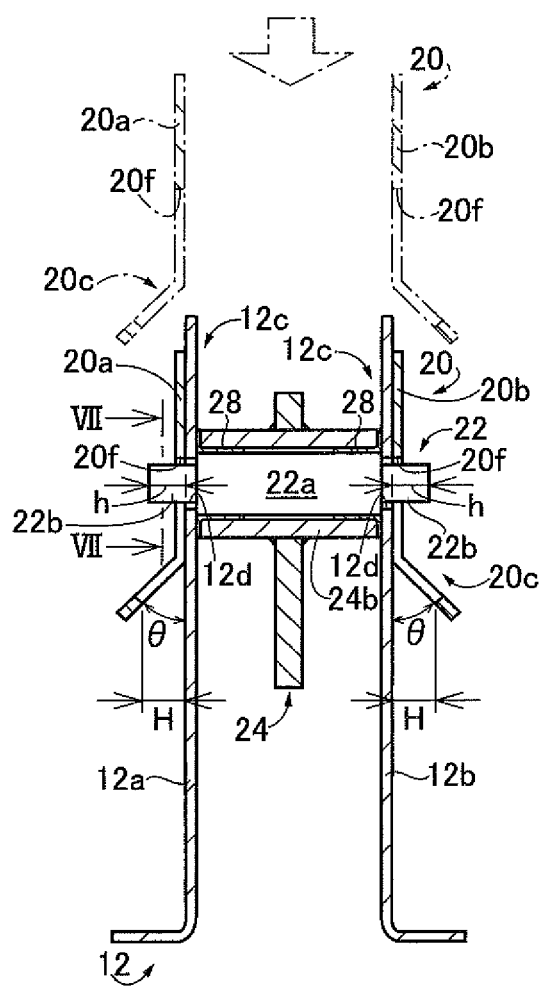
FIG. 5 is a cross sectional view taken along line V-V of FIG. 3, i.e. a cross sectional view showing a state where both ends of the clinching pin inserted through the coupling hole of the main bracket included in the brake pedal device of FIG. 1 are inserted through the insertion hole having the shape of an elongated hole formed in the sub-bracket of FIG. 3.

As shown in FIG. 5, the front ends 20c of the pair of side plate portions 20a, 20b of the sub-bracket 20 are extended outward from an intermediate position in the longitudinal direction of the insertion hole 20f so as to be separated further away from the pair of side plates 12a, 12b toward the dash panel 11, i.e., toward the tip ends of the front ends 20c. In the state where the front ends 20c of the sub-bracket 20 overlap the rear ends 12c of the main bracket 12, the height H from the end on the front end 20c side of each insertion hole 20f having the shape of an elongated hole to the side plate 12a, 12b in the axial direction of the second clinching pin 22 is greater than the height h from each of the ends of the second clinching pin 22 inserted through the coupling holes 12d to the side plate 12a, 12b in the axial direction of the second clinching pin 22. The second clinching pin 22 has a columnar shaft portion 22a and a pair of columnar clinching portions (both ends) 22b protruding from both ends of the shaft portion 22a in the axial direction of the shaft portion 22a, and has a stepped columnar shape with the diameter of the shaft portion 22a being larger than that of the clinching portions 22b. The shaft portion 22a has such a diameter that the shaft portion 22a cannot pass through the coupling holes 12d and the insertion holes 20f. The clinching portions 22b have such a diameter that the clinching portions 22b can pass through the coupling holes 12d and the insertion holes 20f.

Accordingly, as shown in FIG. 5, the clinching portions 22b of the second clinching pin 22 can be inserted through the insertion holes 20f of the sub-bracket 20 by moving the front ends 20c of the sub-bracket 20 toward the clinching portions 22b of the second clinching pin 22 inserted through the coupling holes 12d of the main bracket 12. That is, the insertion holes 20f have the shape of an elongated hole having such a length that allows the clinching portions 22h of the second clinching pin 22 which protrude from the coupling holes 12d of the pair of side plates 12a, 12b to pass therethrough in the state where the front ends 20c of the side plate portions 20a, 20b are extended outward. The longitudinal length of the insertion holes 20f having the shape of an elongated hole, the height of the clinching portions 22b (clinching margin) of the second clinching pin 22, the opening angle θ of the front ends 20c of the side plate portions 20a, 20b which are extended outward with respect to the side plates 12a, 12b, etc. may be adjusted as appropriate so that the sub-bracket 20 does not interfere with the second clinching pin 22 when the clinching portions 22b of the second clinching pin 22 are inserted through the insertion holes 20f of the sub-bracket 20. For example, the longitudinal length of the insertion holes 20f having the shape of an elongated hole may be reduced if the opening angle θ is large. The longitudinal length of the insertion holes 20f having the shape of an elongated hole need be increased if the opening angle θ is small.

As shown in FIGS. 1 and 2, the rear ends 20d of the sub-bracket 20, namely the coupling plate portion 20e, are located higher from, e.g., a floor, not shown, than the insertion holes 20f formed in the front ends 20c of the sub-bracket 20. When the brake pedal 16 is not operated, a tip end 24c on the opposite side of the pivot lever 24 from the second clinching pin 22 side is in contact with the coupling plate portion 20e of the sub-bracket 20 or is located close to the coupling plate portion 20e.

In the backward movement preventing mechanism 18 of the brake pedal device 10 configured as described above, if the dash panel 11 moves backward toward the driver's seat by, e.g., a load applied from the front of the vehicle due to a collision etc., a force F is applied from the instrument panel reinforcement 19 to the rear ends 20d of the sub-bracket 20, namely the coupling plate portion 20e, and the sub-bracket 20 is caused to pivot with respect to the main bracket 12 in the direction shown by an arrow B about the second clinching pin 22. Moreover, the tip end 24c of the pivot lever 24 contacts the coupling plate portion 20e, and the pivot lever 24 is caused to pivot in the direction shown by the arrow B about the second clinching pin 22. The brake pedal 16 is thus caused to pivot in the direction in which the brake pedal 16 is operated, namely the direction shown by the arrow A, via the pair of coupling links 26. The stepping portion 16a of the brake pedal 16 is therefore prevented from moving backward toward the driver's seat even if the dash panel 11 moves backward.

Figure 6:
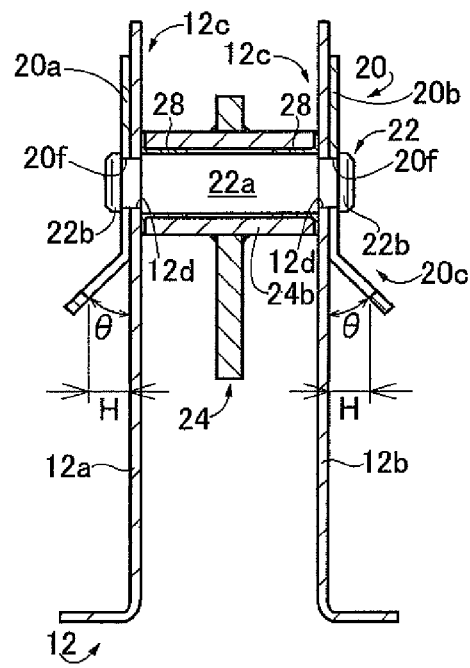
FIG. 6 is a cross sectional view showing a state where both ends of the clinching pin of FIG. 5 are attached each other by clinching and the sub-bracket is attached to the main bracket.

A method for attaching the sub-bracket 20 to the main bracket 12 will be described below with reference to FIGS. 5 to 7. First, as shown in FIG. 5, the second clinching pin 22 is fitted through the cylindrical portion 24b of the pivot lever 24, and the clinching portions 22b that are both ends of the second clinching pin 22 are inserted through the coupling holes 12d formed in the side plates 12a, 12b of the main bracket 12. Next, the front ends 20c of the sub-bracket 20 are moved toward the clinching portions 22b of the second clinching pin 22 inserted through the coupling holes 12d of the main bracket 12, so that the clinching portions 22b of the second clinching pin 22 are inserted through the insertion holes 20f of the sub-bracket 20. Preferably, as shown in FIG. 7, positioning is performed with, e.g., a positioning jig etc. so that the center E2 of the end of the insertion hole 20f on the rear end 20d side, the center E1 of the coupling hole 12d, and the axis G of the clinching portion 22b of the second clinching pin 22 match each other in position.

Then, as shown in FIG. 5, in the state where the clinching portions 22b of the second clinching pin 22 inserted through the coupling holes 12d are inserted through the insertion holes 20f and positioned as described above, the clinching portions 22b of the second clinching pin 22 are compressed in the axial direction of the second clinching pin 22 by clinching with, e.g., a clinching machine etc. As shown in FIG. 6, the rear ends 12e of the pair of side plates 12a, 12b of the main bracket 12 are thus attached to the front ends 20c of the pair of side plate portions 20a, 20b of the sub-bracket 20 by clinching such that the rear ends 12c closely contact the front ends 20c, whereby the sub-bracket 20 is attached to the main bracket 12. When both ends of the second clinching pin 22 are compressed in the axial direction of the second clinching pin 22 by press clinching, the clinching portions 22b of the second clinching pin 22 expand toward the inner peripheral surfaces of the octagonal coupling holes 12d and the octagonal insertion holes 20f, as shown in FIG. 7. Those parts of the front ends 20c of the sub-bracket 20 which are extended outward so as to be separated away from the side plates 12a, 12b of the main bracket 12 may be bent so as to extend substantially parallel to the side plates 12a, 12b of the main bracket 12 after the clinching portions 22b of the second clinching pin 22 are inserted through the insertion holes 20f of the sub-bracket 20 or after the clinching portions 22b of the second clinching pin 22 are clinched.

As described above, according to the brake pedal device 10 of the present embodiment, the inner peripheral edges of the coupling holes 12d and the insertion holes 20f have a non-circular shape such as, e.g., an octagonal shape in which the distances r1, r2 from the centers E1, E2 of the coupling hole 12d and the insertion hole 20f vary periodically in one circumferential direction about the centers E1, E2. Accordingly, when both ends of the second clinching pin 22 are compressed in the axial direction of the second clinching pin 22 by clinching in the state where the clinching portions 22b of the second clinching pin 22 inserted through the coupling holes 12d are inserted through the insertion holes 20f, the clinching portions 22b of the second clinching pin 22 expand toward the inner peripheral surfaces of the octagonal coupling holes 12d and the octagonal insertion holes 20f. The inner peripheral surfaces of the coupling holes 12d and the insertion holes 20f therefore serve as stoppers that stop turning of the sub-bracket 20 with respect to the main bracket 12 about the second clinching pin 22. The sub-bracket 20 can thus be prevented from easily turning with respect to the main bracket 12 by a relatively light load. Since the pair of side plates 12a, 12b of the main bracket 12 are attached to the pair of side plate portions 20a, 20b of the sub-bracket 20 by clinching of the second clinching pin 22, an increase in the number of parts and an increase in assembly time can be suppressed as compared to conventional vehicle pedal devices in which a pair of side plates of a main bracket are fastened to a pair of side plate portions of a sub-bracket with a bolt and nuts.

According to the brake pedal device 10 of the present embodiment, the front ends 20c of the pair of side plate portions 20a, 20b of the sub-bracket 20 are extended outward so as to be separated further away from the pair of side plates 12a, 12b of the main bracket 12 toward the dash panel 11, i.e., toward the tip ends of the front ends 20c. The insertion holes 20f formed in the pair of side plate portions 20a, 20b have the shape of an elongated hole having such a length that allows the clinching portions 22b that are both ends of the second clinching pin 22 and protrude from the pair of side plates 12a, 12b to pass therethrough in the state where the front ends 20c of the side plate portions 20a, 20b are extended outward. Accordingly, the clinching portions 22b of the second clinching pin 22 can be inserted through the insertion holes 20f of the sub-bracket 20 by moving the front ends 20c of the sub-bracket 20 toward the clinching portions 22b of the second clinching pin 22 inserted through the coupling holes 12d of the main bracket 12. This can improve workability in attaching the sub-bracket 20 to the main bracket 12.

According to the brake pedal device 10 of the present embodiment, the second clinching pin 22 turnably supports the pivot lever 24 that, when the dash panel 11 moves backward and the sub-bracket 20 is caused to pivot with respect to the main bracket 12 in the direction shown by the arrow B about the second clinching pin 22, pivots together with the sub-bracket 20 to cause the brake pedal 16 to pivot in the direction in which the brake pedal 16 is operated. Accordingly, if the dash panel 11 moves backward, the main bracket 12 and the sub-bracket 20 which have been attached to each other by clinching are folded about the second clinching pin 22. The brake pedal device 10 can thus have the backward movement preventing capability to prevent the stepping portion 16a of the brake pedal 16 from moving backward toward the driver's seat.

According to the brake pedal device 10 of the present embodiment, the rear ends 20d of the sub-bracket 20 are located higher from the floor than the insertion holes 20f formed in the front ends 20c of the sub-bracket 20. This allows the sub-bracket 20 to pivot with respect to the main bracket 12 about the second clinching pin 22 in a preferable manner if the dash panel 11 moves backward. Moreover, a load that causes the sub-bracket 20 to pivot with respect to the main bracket 12 about the second clinching pin 22 can be set by adjusting the number of vertices of the shape of the coupling holes 12d and the insertion holes 20f as appropriate, namely by setting the number of vertices to 8 in the present embodiment.

Other embodiments of the present invention will be described in detail below with reference to the drawings. In the following description, the same portions in different embodiments are denoted with the same reference numerals, and description thereof will be omitted.

Second Embodiment

Figure 8:
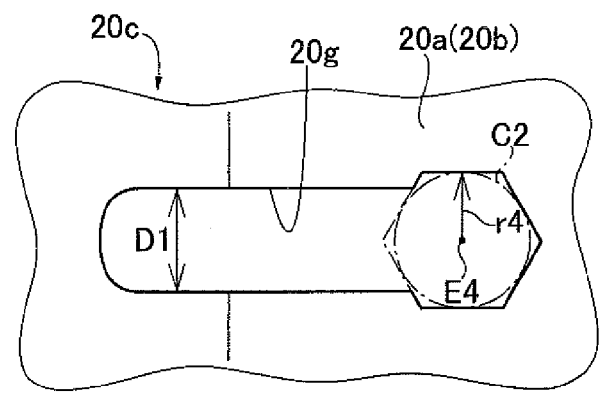
FIG. 8 is a view showing a brake pedal device of another embodiment of the present invention, a view corresponding to FIG. 4.
Figure 9:
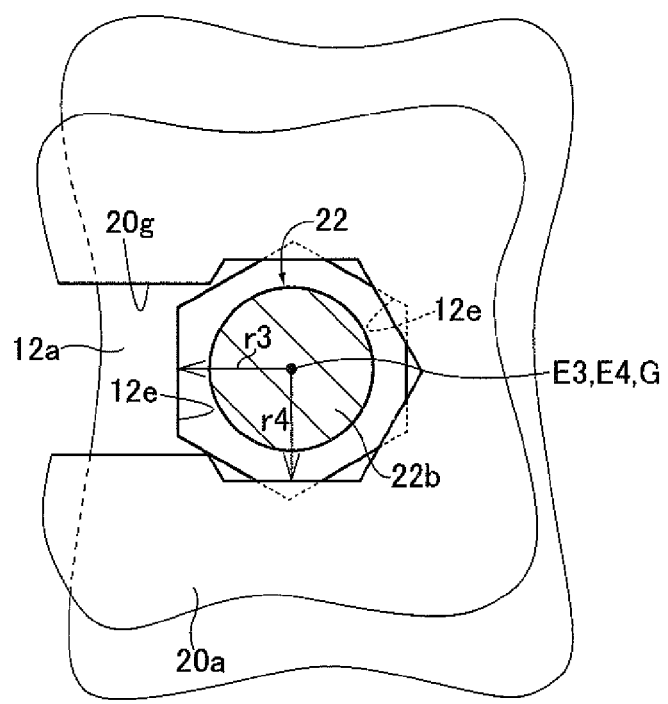
FIG. 9 is a view showing the shapes of the coupling hole and the insertion hole formed in the main bracket and the sub-bracket included in the brake pedal device of FIG. 8, a view corresponding to FIG. 7.

As shown in FIGS. 8 and 9, in a brake pedal device (vehicle pedal device) of the present embodiment, coupling holes 12e and insertion holes 20g are different in shape from the coupling holes 12d and the insertion holes 20f in the brake pedal device 10 of the first embodiment. The brake pedal device of the present embodiment is otherwise substantially similar to the brake pedal device 10 of the first embodiment.

As shown in FIG. 8, each of the insertion holes 20g of the sub-bracket 20 is an elongated hole extending substantially in the same direction as the longitudinal direction of the side plate portions 20a, 20b, namely in the direction toward the dash panel 11, in a manner substantially similar to that of the insertion holes 20f of the first embodiment. The end on the rear end 20d side of the insertion hole 20g having the shape of an elongated hole has a hexagonal shape (polygonal shape), and the inscribed circle C2 of the hexagon has a diameter larger than the lateral dimension D1 of the insertion hole 20g other than the end on the rear end 20d side. As shown in FIG. 9, each of the coupling holes 12e of the main bracket 12 has a hexagonal shape (polygonal shape). The coupling holes 12e and the insertion holes 20g are sized so as not to allow the shaft portion 22a of the second clinching pin 22 to pass therethrough and so as to allow the clinching portions 22b of the second clinching pin 22 to pass therethrough. When both ends of the second clinching pin 22 are compressed in the axial direction by clinching, the clinching portions 22b of the second clinching pin 22 expand toward the inner peripheral surfaces of the hexagonal coupling holes 12e and the hexagonal insertion holes 20g. As in the first embodiment, the inner peripheral surfaces of the coupling holes 12e and the insertion holes 20g therefore serve as stoppers that stop turning of the sub-bracket 20 with respect to the main bracket 12 about the second clinching pin 22. As shown in FIGS. 8 and 9, the inner peripheral edges of the hexagonal coupling hole 12e and the hexagonal insertion hole 20g have such a non-circular shape that the distances r3, r4 from the centers E3, E4 of the coupling hole 12e and the insertion hole 20g vary periodically in one circumferential direction about the centers E3, E4.

Third Embodiment

Figure 10:
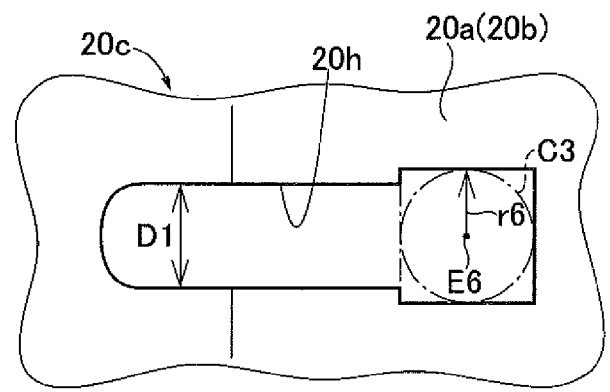
FIG. 10 is a view showing a brake pedal device of yet another embodiment of the present invention, a view corresponding to FIGS. 4 and 8.
Figure 11:
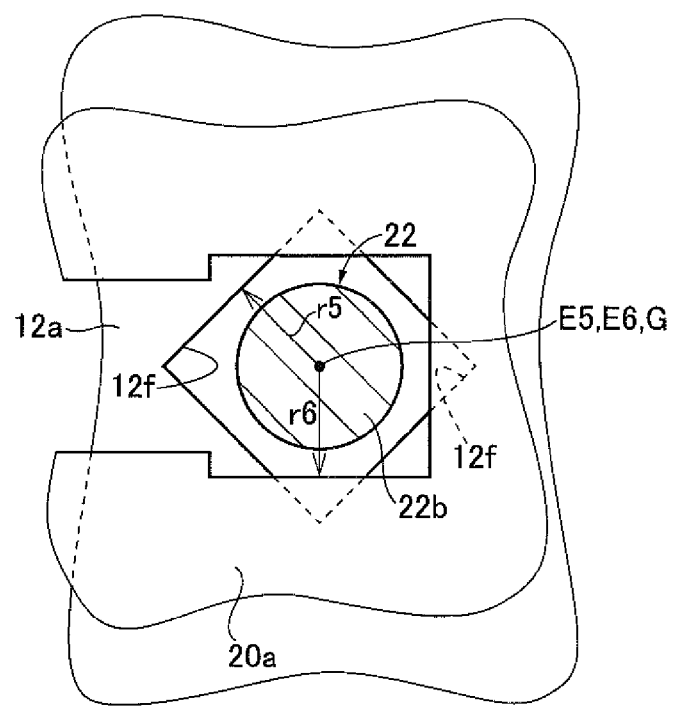
FIG. 11 is a view showing the shapes of the coupling hole and the insertion hole formed in the main bracket and the sub-bracket included in the brake pedal device of FIG. 10, a view corresponding to FIGS. 7 and 9.

As shown in FIGS. 10 and 11, in a brake pedal device (vehicle pedal device) of the present embodiment, coupling holes 12f and insertion holes 20h are different in shape from the coupling holes 12d and the insertion holes 20f in the brake pedal device 10 of the first embodiment. The brake pedal device of the present embodiment is otherwise substantially similar to the brake pedal device 10 of the first embodiment.

As shown in FIG. 10, each of the insertion holes 20h of the sub-bracket 20 is an elongated hole extending substantially in the same direction as the longitudinal direction of the side plate portions 20a, 20b, namely in the direction toward the dash panel 11, in a manner substantially similar to that of the insertion holes 20f of the first embodiment. The end on the rear end 20d side of the insertion hole 20h having the shape of an elongated hole has a quadrilateral shape (polygonal shape), and the inscribed circle C3 of the quadrilateral shape has a diameter larger than the lateral dimension D1 of the insertion hole 20h other than the end on the rear end 20d side. As shown in FIG. 11, each of the coupling holes 12f of the main bracket 12 has a quadrilateral shape (polygonal shape). The coupling holes 12f and the insertion holes 20h are sized so as not to allow the shaft portion 22a of the second clinching pin 22 to pass therethrough and so as to allow the clinching portions 22b of the second clinching pin 22 to pass therethrough. When both ends of the second clinching pin 22 are compressed in the axial direction by clinching, the clinching portions 22b of the second clinching pin 22 expand toward the inner peripheral surfaces of the quadrilateral coupling holes 12f and the quadrilateral insertion holes 20h. As in the first embodiment, the inner peripheral surfaces of the coupling holes 12f and the insertion holes 20h therefore serve as stoppers that stop turning of the sub-bracket 20 with respect to the main bracket 12 about the second clinching pin 22. As shown in FIGS. 10 and 11, the inner peripheral edges of the quadrilateral coupling hole 12f and the quadrilateral insertion hole 20h have such a non-circular shape that the distances r5, r6 from the centers E5, E6 of the coupling hole 12f and the insertion hole 20h vary periodically in one circumferential direction about the centers E5, E6.

Fourth Embodiment

Figure 12:
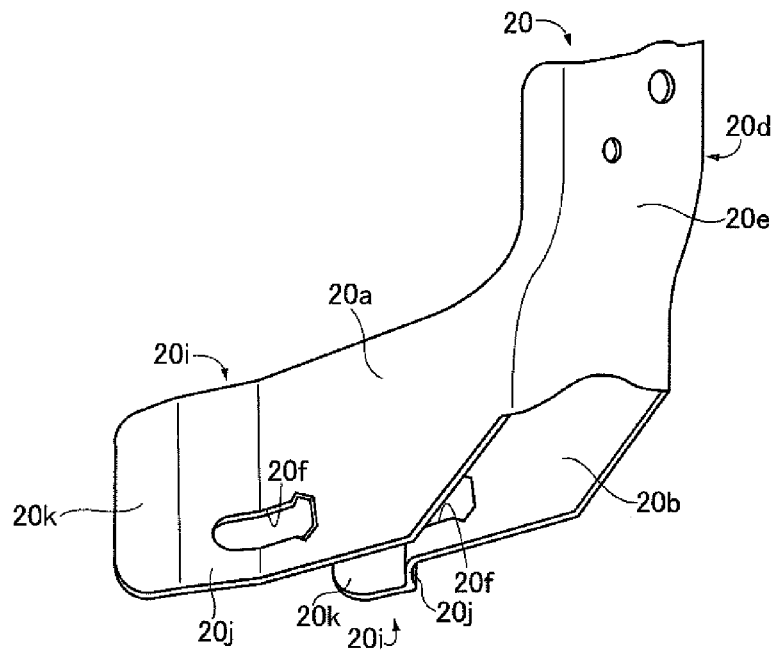
FIG. 12 is a view showing a brake pedal device of yet another embodiment of the present invention, a perspective view showing a sub-bracket included in the brake pedal device.
Figure 13:
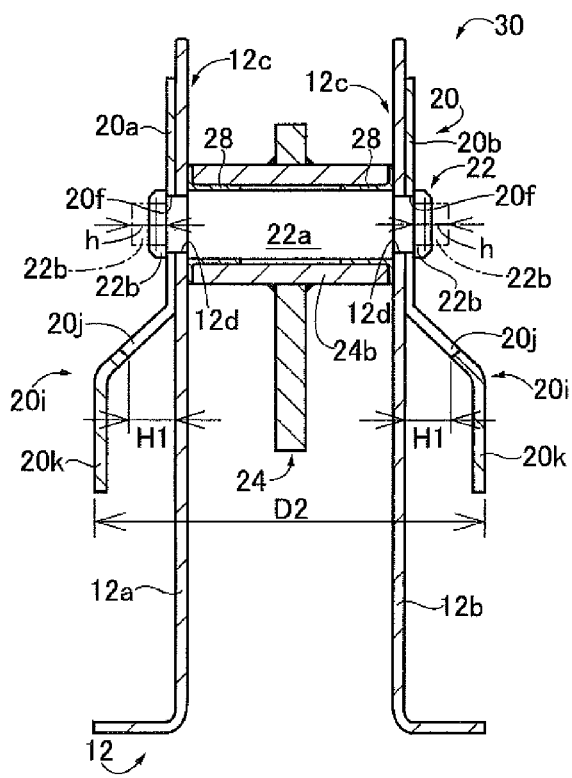
FIG. 13 is a cross sectional view showing a state where the sub-bracket is attached to the main bracket included in the brake pedal device of FIG. 12.

As shown in FIGS. 12 and 13, in a brake pedal device (vehicle pedal device) 30 of the present embodiment, front ends 20i of the side plate portions 20a, 20b of the sub-bracket 20 are different in shape from the front ends 20c of the side plate portions 20a, 20b in the brake pedal device 10 of the first embodiment. The brake pedal device 30 of the present embodiment is otherwise substantially similar to the brake pedal device 10 of the first embodiment.

As shown in FIGS. 12 and 13, each of the front ends 20i of the pair of side plate portions 20a, 20b of the sub-bracket 20 integrally includes an outwardly extended portion 20j extended outward from an intermediate position in the longitudinal direction of the insertion hole 20f so as to be separated further away from the side plate 12a, 12b toward the dash panel 11, i.e., toward the tip end of the front end 20i, and a bent portion 20k formed by bending the tip end part of the outwardly extended portion 20j so as to extend substantially parallel to the side plate 12a, 12b. That is, the front ends 20i of the sub-bracket 20 are bent twice. As shown in FIG. 13, in the state where the front ends 20i of the sub-bracket 20 overlap the rear ends 12c of the main bracket 12, the height H1 from the end on the front end 20i side of each insertion hole 20f having the shape of an elongated hole to the side plate 12a, 12b in the axial direction of the second clinching pin 22 is greater than the height h from each of the ends of the second clinching pin 22 before clinching, which have been inserted through the coupling holes 12d, to the side plate 12a, 12b in the axial direction of the second clinching pin 22, as in the first embodiment.

According to the brake pedal device 30 of the present embodiment, each of the front ends 20i of the pair of side plate portions 20a, 20b of the sub-bracket 20 includes the outwardly extended portion 20j extended outward so as to be separated away from the side plate 12a, 12b, and the bent portion 20k formed by bending the tip end part of the outwardly extended portion 20j so as to extend substantially parallel to the side plate 12a, 12b, and the front ends 20i are thus bent twice. This can minimize the lateral dimension D2 of the sub-bracket 20 in the axial direction of the second clinching pin 22 while securing the height H1 of the insertion holes 20f of the sub-bracket 20 in the axial direction of the second clinching pin 22.

Fifth Embodiment

Figure 14:
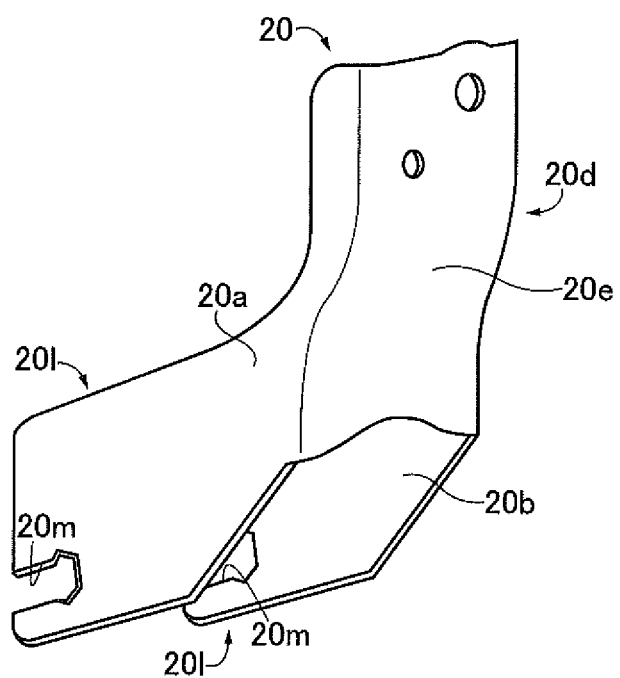
FIG. 14 is a view showing a brake pedal device of yet another embodiment of the present invention, a perspective view showing a sub-bracket included in the brake pedal device.

As shown in FIG. 14, in a brake pedal device (vehicle pedal device) of the present embodiment, front ends 20l of the side plate portions 20a, 20b of the sub-bracket 20 are different in shape from the front ends 20c of the side plate portions 20a, 20b in the brake pedal device 10 of the first embodiment. The brake pedal device of the present embodiment is otherwise substantially similar to the brake pedal device 10 of the first embodiment.

As shown in FIG. 14, the front ends 20l of the sub-bracket 20, namely the side plate portions 20a, 20b, are substantially parallel to the side plates 12a, 12b, and are not extended outward like the front ends 20c of the first embodiment. Each of the front ends 20l of the sub-bracket 20 has a cutout 20m formed in its tip end part. Each cutout 20m extends in the longitudinal direction of the side plate portion 20a, 20b, namely in the direction toward the dash panel 11, as in the first embodiment. Like the end on the rear end 20d side of the insertion hole 20f having the shape of an elongated hole in the first embodiment, the end of the cutout 20m on the rear end 20d side has an octagonal shape, and the inscribed circle of the octagon has a diameter larger than the lateral dimension of the cutout 20m other than the end on the rear end 20d side. Each cutout 20m is sized so as not to allow the shaft portion 22a of the second clinching pin 22 to pass therethrough and so as to allow the clinching portion 22b of the second clinching pin 22 to pass therethrough.

Accordingly, the clinching portions 22b of the second clinching pin 22 can be inserted through the cutouts 20m of the sub-bracket 20 by moving the front ends 20l of the sub-bracket 20 toward the clinching portions 22b of the second clinching pin 22 inserted through the coupling holes 12d of the main bracket 12.

According to the brake pedal device of the present embodiment, each of the front ends 20l of the pair of side plate portions 20a, 20b of the sub-bracket 20 has the cutout 20m formed in its tip end part. Since the cutouts 20m are formed in the front ends 20l, the front ends 20l of the sub-bracket 20 need not be extended outward so as to be separated away from the side plates 12a, 12b as in, e.g., the first to fourth embodiments. This can minimize an increase in lateral size of the sub-bracket 20 and an increase in weight of the sub-bracket 20.

Sixth Embodiment

Figure 15:
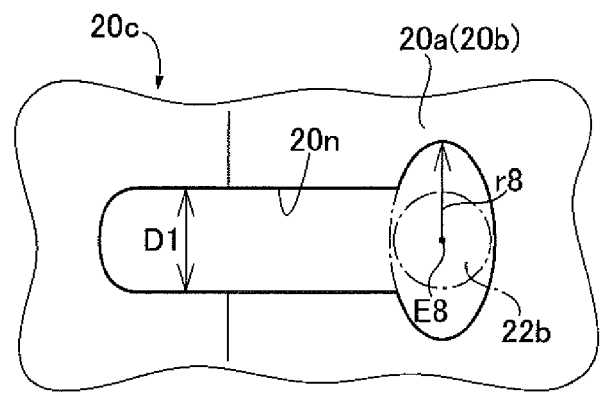
FIG. 15 is a view showing a brake pedal device of yet another embodiment of the present invention, a view corresponding to FIGS. 4, 8, and 10.
Figure 16:
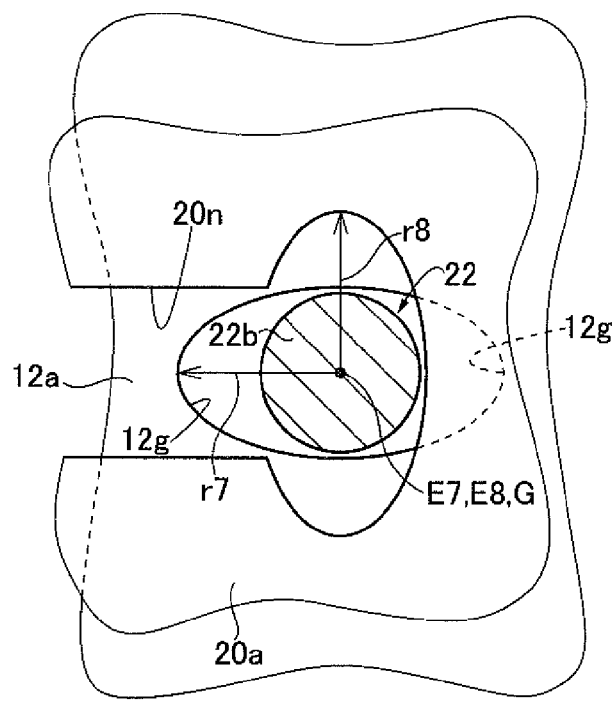
FIG. 16 is a view showing the shapes of the coupling hole and the insertion hole formed in the main bracket and the sub-bracket included in the brake pedal device of FIG. 15, a view corresponding to FIGS. 7, 9 and 11.

As shown in FIGS. 15 and 16, in a brake pedal device (vehicle pedal device) of the present embodiment, coupling holes 12g and insertion holes 20n are different in shape from the coupling holes 12d and the insertion holes 20f in the brake pedal device 10 of the first embodiment. The brake pedal device of the present embodiment is otherwise substantially similar to the brake pedal device 10 of the first embodiment.

As shown in FIG. 15, each of the insertion holes 20n of the sub-bracket 20 is an elongated hole extending substantially in the same direction as the longitudinal direction of the side plate portions 20a, 20b, namely in the direction toward the dash panel 11, in a manner substantially similar to that of the insertion holes 20f of the first embodiment. The end on the rear end 20d side of the insertion holes 20n having the shape of an elongated hole has an elliptical shape. As shown in FIG. 16, each of the coupling holes 12g of the main bracket 12 has an elliptical shape. The coupling holes 12g and the insertion holes 20n are sized so as not to allow the shaft portion 22a of the second clinching pin 22 to pass therethrough and so as to allow the clinching portions 22b of the second clinching pin 22 to pass therethrough. When both ends of the second clinching pin 22 are compressed in the axial direction by clinching, the clinching portions 22b of the second clinching pin 22 expand toward the inner peripheral surfaces of the elliptical coupling holes 12g and the elliptical insertion holes 20n in the longitudinal direction. As in the first embodiment, the inner peripheral surfaces of the coupling holes 12g and the insertion holes 20n therefore serve as stoppers that stop turning of the sub-bracket 20 with respect to the main bracket 12 about the second clinching pin 22.

As shown in FIGS. 15 and 16, the inner peripheral edges of the elliptical coupling hole 12g and the elliptical insertion hole 20n have such a non-circular shape that the distances r7, r8 from the centers E7, E8 of the coupling hole 12g and the insertion hole 20n vary periodically in one circumferential direction about the centers E7, E8.

Seventh Embodiment

Figure 17:
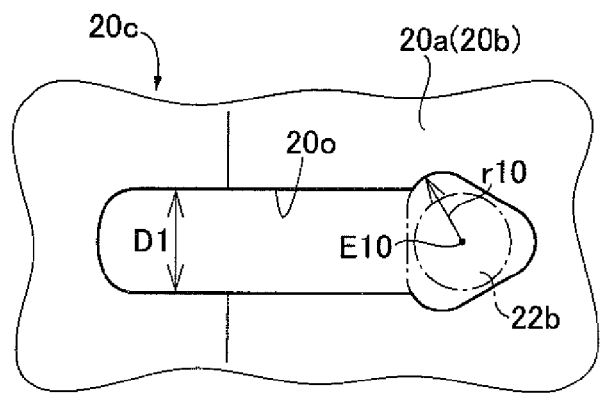
FIG. 17 is a view showing a brake pedal device of yet another embodiment of the present invention, a view corresponding to FIGS. 4, 8, 10 and 15.
Figure 18:
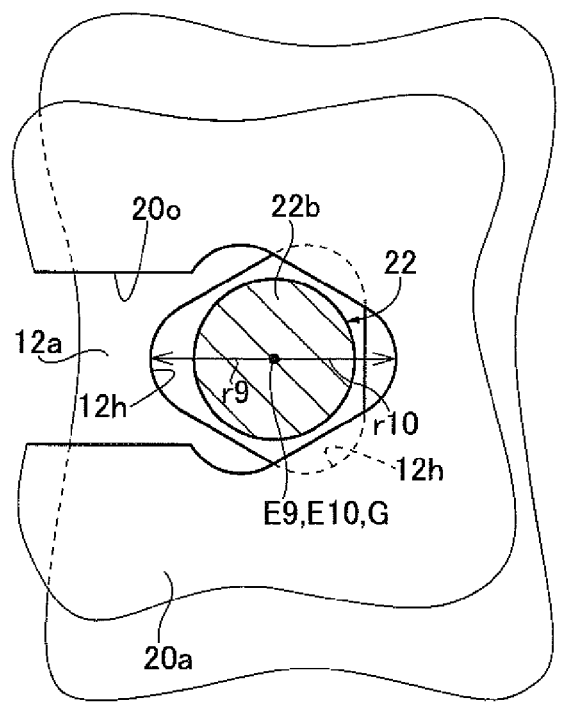
FIG. 18 is a view showing the shapes of the coupling hole and the insertion hole formed in the main bracket and the sub-bracket included in the brake pedal device of FIG. 17, a view corresponding to FIGS. 7, 9, 11 and 16.

As shown in FIGS. 17 and 18, in a brake pedal device (vehicle pedal device) of the present embodiment, coupling holes 12h and insertion holes 20o are different in shape from the coupling holes 12d and the insertion holes 20f in the brake pedal device 10 of the first embodiment. The brake pedal device of the present embodiment is otherwise substantially similar to the brake pedal device 10 of the first embodiment.

As shown in FIG. 17, each of the insertion holes 20o of the sub-bracket 20 is an elongated hole extending substantially in the same direction as the longitudinal direction of the side plate portions 20a, 20b, namely in the direction toward the dash panel 11, in a manner substantially similar to that of the insertion holes 20f of the first embodiment. The end on the rear end 20d side of the insertion hole 20o having the shape of an elongated hole has a triangular shape with rounded corners As shown in FIG. 18, each of the coupling holes 12h of the main bracket 12 has a triangular shape with rounded corner. The coupling holes 12h and the insertion holes 20o are sized so as not to allow the shaft portion 22a of the second clinching pin 22 to pass therethrough and so as to allow the clinching portions 22b of the second clinching pin 22 to pass therethrough. When both ends of the second clinching pin 22 are compressed in the axial direction by clinching, the clinching portions 22b of the second clinching pin 22 expand toward the inner peripheral surfaces with rounded corners of the triangular coupling holes 12h and the triangular insertion holes 20o. As in the first embodiment, the inner peripheral surfaces of the coupling holes 12h and the insertion holes 20o therefore serve as stoppers that stop turning of the sub-bracket 20 with respect to the main bracket 12 about the second clinching pin 22. As shown in FIGS. 17 and 18, the inner peripheral edges of the triangular coupling hole 12h and the triangular insertion hole 20o have such a non-circular shape that the distances r9, r10 from the centers E9, E10 of the coupling hole 12h and the insertion hole 20o vary periodically in one circumferential direction about the centers E9, E10.

Eighth Embodiment

Figure 19:
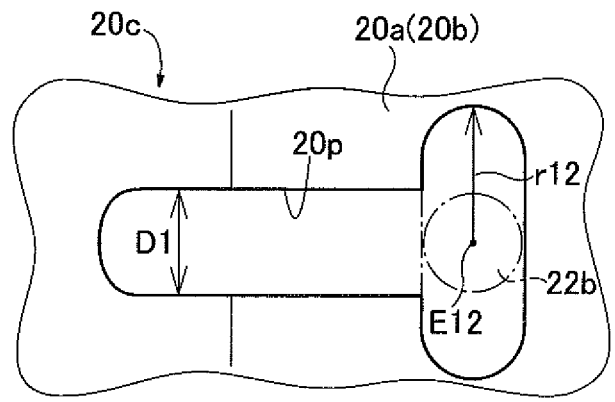
FIG. 19 is a view showing a brake pedal device of yet another embodiment of the present invention, a view corresponding to FIGS. 4, 8, 10, 15 and 17.
Figure 20:
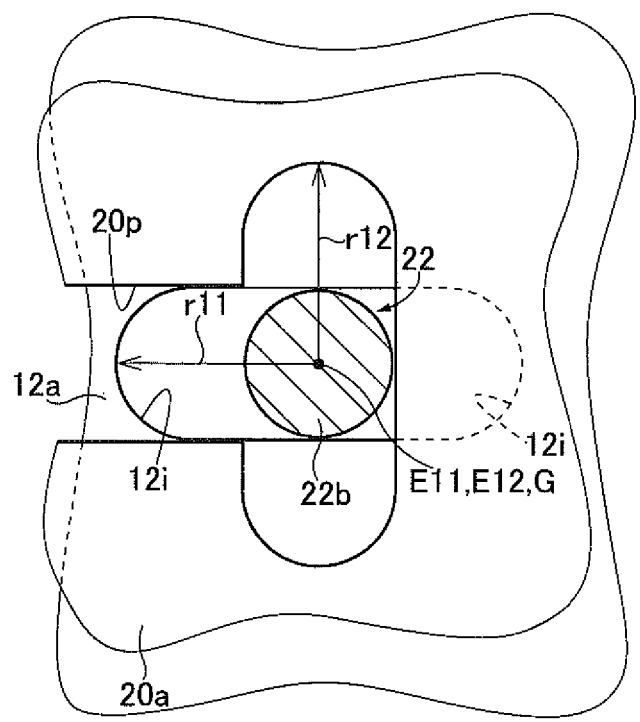
FIG. 20 is a view showing the shapes of the coupling hole and the insertion hole formed in the main bracket and the sub-bracket included in the brake pedal device of FIG. 19, a view corresponding to FIGS. 7, 9, 11, 16 and 18.

As shown in FIGS. 19 and 20, in a brake pedal device (vehicle pedal device) of the present embodiment, coupling holes 12i and insertion holes 20p are different in shape from the coupling holes 12d and the insertion holes 20f in the brake pedal device 10 of the first embodiment. The brake pedal device of the present embodiment is otherwise substantially similar to the brake pedal device 10 of the first embodiment.

As shown in FIG. 19, each of the insertion holes 20p of the sub-bracket 20 is an elongated hole extending substantially in the same direction as the longitudinal direction of the side plate portions 20a, 20b, namely in the direction toward the dash panel 11, in a manner substantially similar to that of the insertion holes 20f of the first embodiment. The end on the rear end 20d side of the insertion hole 20p having the shape of an elongated hole has an elongated hole shape extending in the direction perpendicular to the longitudinal direction of the insertion hole 20p. As shown in FIG. 20, each of the coupling holes 12i of the main bracket 12 has an elongated hole shape extending substantially in the same direction as the longitudinal direction of the insertion holes 20p. The coupling holes 12i and the insertion holes 20p are sized so as not to allow the shaft portion 22a of the second clinching pin 22 to pass therethrough and so as to allow the clinching portions 22b of the second clinching pin 22 to pass therethrough. When both ends of the second clinching pin 22 are compressed in the axial direction by clinching, the clinching portions 22h of the second clinching pin 22 expand toward the inner peripheral surfaces of the ends of the coupling holes 12i having an elongated hole shape and the insertion holes 20p having an elongated hole shape. As in the first embodiment, the inner peripheral surfaces of the coupling holes 12i and the insertion holes 20p therefore serve as stoppers that stop turning of the sub-bracket 20 with respect to the main bracket 12 about the second clinching pin 22. As shown in FIGS. 19 and 20, the inner peripheral edges of the coupling hole 12i having an elongated hole shape and the insertion hole 20p having an elongated hole shape have such a non-circular shape that the distances r11, r12 from the centers E11, E12 of the coupling hole 12i and the insertion hole 20p vary periodically in one circumferential direction about the centers E11, E12.

Ninth Embodiment

Figure 21:
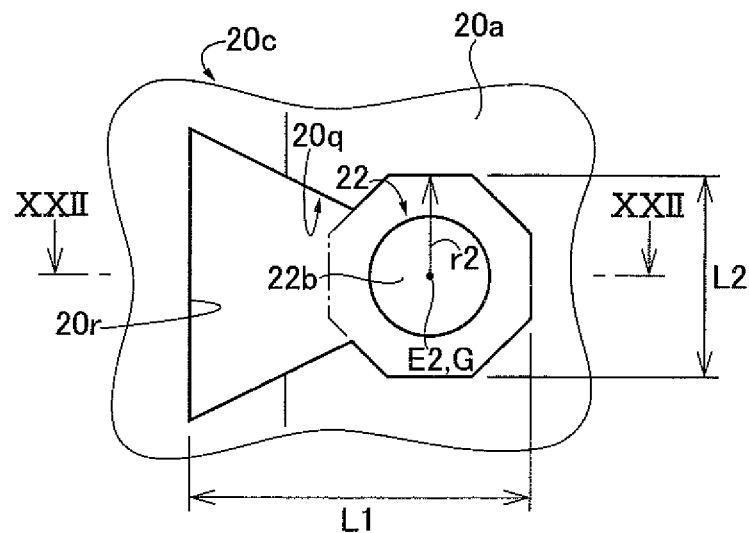
FIG. 21 is a view showing a brake pedal device of yet another embodiment of the present invention, a view showing the shape of the insertion hole of the sub-bracket included in the brake pedal device.
Figure 22:
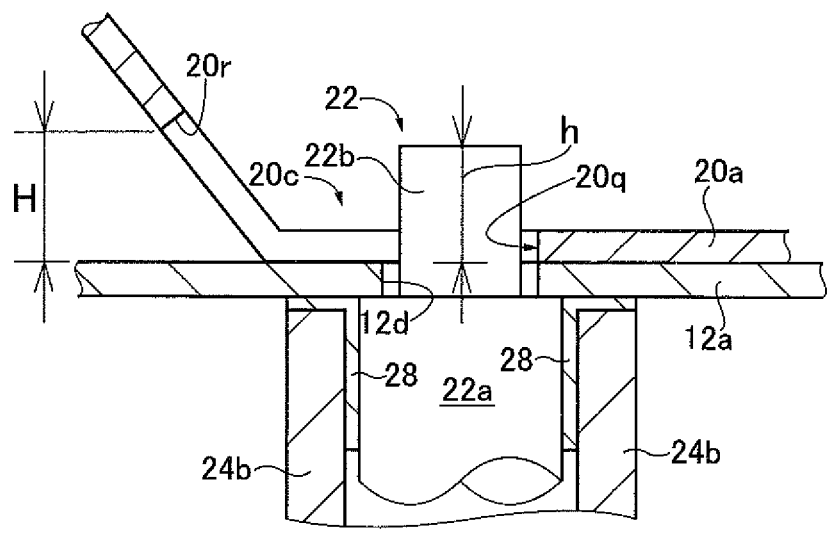
FIG. 22 is a cross sectional view taken along line XXII-XXII of FIG. 21.

As shown in FIGS. 21 and 22, in a brake pedal device (vehicle pedal device) of the present embodiment, insertion holes 20q are different in shape from the insertion holes 20f in the brake pedal device 10 of the first embodiment. The brake pedal device of the present embodiment is otherwise substantially similar to the brake pedal device 10 of the first embodiment. That is, the end of each insertion hole 20q on the rear end 20d side has the same octagonal shape as the end of the insertion hole 20f on the rear end 20d side, and the insertion hole 20q other than the end on the rear end 20d side has a different shape from the elongated hole shape of the insertion hole 20f other than the end on the rear end 20d side. Since the insertion hole 20q is formed similarly in both of the front ends 20c of the pair of side plate portions 20a, 20b, only the front end 20c of the side plate portion 20a will be described below.

As shown in FIG. 21, the insertion hole 20q other than the end on the rear end 20d side has a polygonal shape such as, e.g., a trapezoidal shape. As shown in FIGS. 21 and 22, each of the front ends 20c of the side plate portion 20a of the sub-bracket 20 extends outward from an intermediate position of the insertion hole 20q having a trapezoidal shape so as to be separated further away from the side plate 12a toward the dash panel 11, i.e., toward the tip end of the front end 20c. As shown in FIG. 22, in the state where the front ends 20e of the sub-bracket 20 overlap the rear ends 12c of the main bracket 12, the height H from the end 20r on the front end 20c side of each insertion hole 20q to the side plate 12a in the axial direction of the second clinching pin 22 is greater than the height h from each of the ends of the second clinching pin 22 inserted through the coupling holes 12d to the side plate 12a in the axial direction of the second clinching pin 22. Accordingly, as in the first embodiment, the clinching portions 22b of the second clinching pin 22 can be inserted through the insertion holes 20q of the sub-bracket 20 by moving the front ends 20c of the sub-bracket 20 toward the clinching portions 22b of the second clinching pin 22 inserted through the coupling holes 12d of the main bracket 12. Each insertion hole 20q has the shape of such an elongated hole that the longitudinal dimension L1 of the insertion hole 20q in the longitudinal direction of the side plate portions 20a, 20b is larger than the lateral dimension L2 of the octagonal end on the rear end 20d side of the insertion hole 20q in the direction perpendicular to the longitudinal direction of the side plate portions 20a, 20b. That is, the insertion holes 20q are elongated holes extending generally in the longitudinal direction of the side plate portions 20a, 20b like the insertion holes 20f of the first embodiment.

Tenth Embodiment

Figure 23:
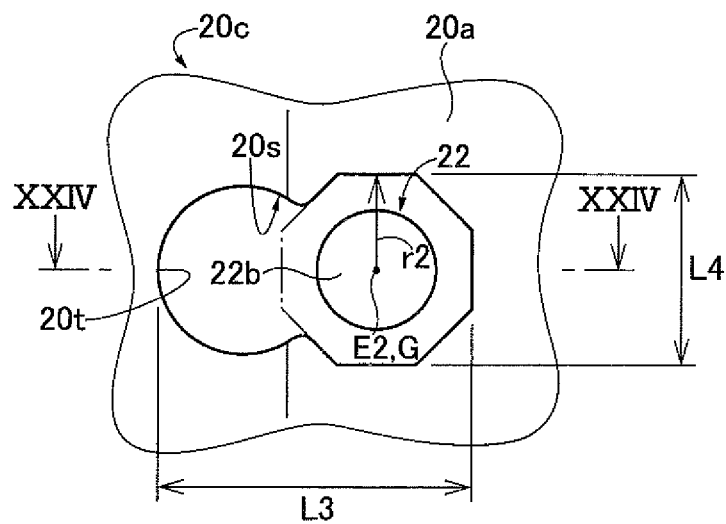
FIG. 23 is a view showing a brake pedal device of yet another embodiment of the present invention, a view showing the shape of the insertion hole of the sub-bracket included in the brake pedal device.
Figure 24:
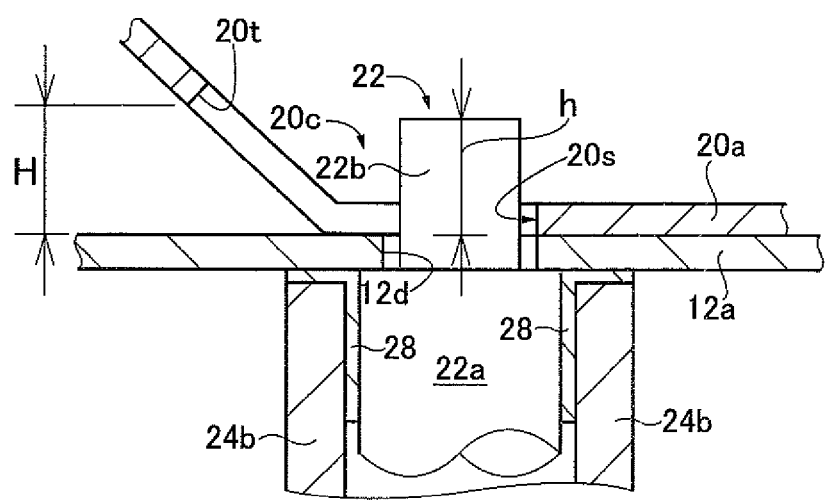
FIG. 24 is a cross sectional view taken along line XXIV-XXIV of FIG. 23.

As shown in FIGS. 23 and 24, in a brake pedal device (vehicle pedal device) of the present embodiment, insertion holes 20s are different in shape from the insertion holes 20f in the brake pedal device 10 of the first embodiment. The brake pedal device of the present embodiment is otherwise substantially similar to the brake pedal device 10 of the first embodiment. That is, the end of each insertion hole 20s on the rear end 20d side has the same octagonal shape as the end of the insertion hole 20f on the rear end 20d side, and the insertion hole 20s other than the end on the rear end 20d side has a different shape from the elongated hole shape of the insertion hole 20f other than the end on the rear end 20d side. Since the insertion holes 20s are formed similarly in both of the front ends 20c of the pair of side plate portions 20a, 20b, only the front end 20c of the side plate portion 20a will be described below.

As shown in FIG. 23, the insertion hole 20s other than the end on the rear end 20d side has a circular shape. As shown in FIGS. 23 and 24, each of the front ends 20c of the side plate portion 20a of the sub-bracket 20 extends outward from an intermediate position of the insertion hole 20s having a circular shape so as to be separated further away from the side plate 12a toward the dash panel 11, i.e., toward the tip end of the front end 20c. As shown in FIG. 24, in the state where the front ends 20c of the sub-bracket 20 overlap the rear ends 12c of the main bracket 12, the height H from the end 20t on the front end 20c side of each insertion hole 20s to the side plate 12a in the axial direction of the second clinching pin 22 is greater than the height h from each of the ends of the second clinching pin 22 inserted through the coupling holes 12d to the side plate 12a in the axial direction of the second clinching pin 22. Accordingly, as in the first embodiment, the clinching portions 22b of the second clinching pin 22 can be inserted through the insertion holes 20s of the sub-bracket 20 by moving the front ends 20c of the sub-bracket 20 toward the clinching portions 22b of the second clinching pin 22 inserted through the coupling holes 12d of the main bracket 12. Each insertion hole 20s has the shape of such an elongated hole that the longitudinal dimension L3 of the insertion hole 20s in the longitudinal direction of the side plate portions 20a, 20b is larger than the lateral dimension L4 of the octagonal end on the rear end 20d side of the insertion hole 20s in the direction perpendicular to the longitudinal direction of the side plate portions 20a, 20b. That is, the insertion holes 20s are elongated holes extending generally in the longitudinal direction of the side plate portions 20a, 20b like the insertion holes 20f of the first embodiment.

Eleventh Embodiment

Figure 25:
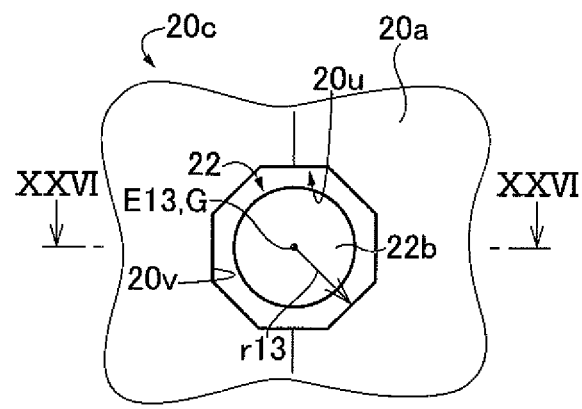
FIG. 25 is a view showing a brake pedal device of yet another embodiment of the present invention, a view showing the shape of the insertion hole of the sub-bracket included in the brake pedal device.
Figure 26:
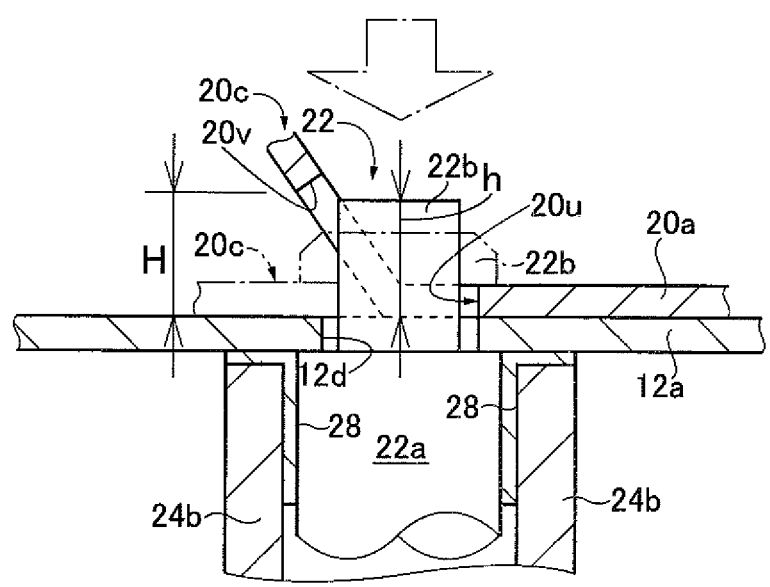
FIG. 26 is a cross sectional view taken along line XXVI-XXVI of FIG. 25.

As shown in FIGS. 25 and 26, in a brake pedal device (vehicle pedal device) of the present embodiment, insertion holes 20u are different in shape from the insertion holes 20f in the brake pedal device 10 of the first embodiment. The brake pedal device of the present embodiment is otherwise substantially similar to the brake pedal device 10 of the first embodiment. Since the insertion holes 20u are formed similarly in both of the front ends 20c of the pair of side plate portions 20a, 20b, only the front end 20c of the side plate portion 20a will be described below.

As shown in FIG. 25, each of the insertion holes 20u has a polygonal shape, for example, an octagonal shape. The inner peripheral edge of the octagonal insertion hole 20u has such a non-circular shape that the distance r13 from the center E13 of the insertion hole 20u varies periodically in one circumferential direction about the center E13.

As shown in FIGS. 25 and 26, each of the front ends 20c of the side plate portion 20a of the sub-bracket 20 extends outward from an intermediate position of the octagonal insertion hole 20u so as to be separated further away from the side plate 12a toward the dash panel 11, i.e., toward the tip end of the front end 20c. As shown in FIG. 26, in the state where the front ends 20c of the sub-bracket 20 overlap the rear ends 12c of the main bracket 12, the height H from the end 20v on the front end 20e side of each insertion hole 20u to the side plate 12a in the axial direction of the second clinching pin 22 is greater than the height h from each of the ends of the second clinching pin 22 inserted through the coupling holes 12d to the side plate 12a in the axial direction of the second clinching pin 22.

Accordingly, as in the first embodiment, the clinching portions 22b of the second clinching pin 22 can be inserted through the insertion holes 20u of the sub-bracket 20 by moving the front ends 20c of the sub-bracket 20 toward the clinching portions 22b of the second clinching pin 22 inserted through the coupling holes 12d of the main bracket 12. And after that, when the both ends of the second clinching pin 22 are compressed in the axial direction of the second clinching pin 22 by clinching, parts of the front ends 20c of the sub-bracket 20 extended outward deforms in substantially parallel to the side plate 12a, 12b and, the clinching portions 22b of the second clinching pin 22 expand toward the inner peripheral surfaces of the octagonal coupling holes 12d and the octagonal insertion holes 20u.

Although the embodiments of the present invention are described above based on the drawings, the present invention is applicable in other forms.

For example, although the present invention is applied to the brake pedal devices 10, 30 in the embodiments, the present invention need not necessarily be applied to the brake pedal devices 10, 30. For example, the present invention may be applied to vehicle pedal devices such as an accelerator pedal device, a parking brake pedal device, and a clutch pedal device.

In the first to third embodiments, the ends on the rear end 20d side of the insertion holes 20f, 20g, 20h having the shape of an elongated hole and the coupling holes 12d, 12e, 12f have a quadrilateral shape, a hexagonal shape, or an octagonal shape. However, the ends of the insertion holes 20f, 20g, 20h on the rear end 20d side and the coupling holes 12d, 12e, 12f may have other polygonal shapes. In the embodiments, the ends on the rear end 20d side of the insertion holes 20f, 20g, 20h, 20n, 20o, 20p having the shape of an elongated hole and the coupling holes 12d, 12e, 12f, 12g, 12h, 12i have a quadrilateral shape, a hexagonal shape, an octagonal shape, an elliptical shape, a triangular shape with rounded corners, or an elongated hole shape. However, the ends of the insertion holes 20f, 20g, 20h, 20n, 20o, 20p on the rear end 20d side and the coupling holes 12d, 12e, 12f, 12g, 12h, 12i may have other shapes. That is, the inner peripheral edges of the ends on the rear end 20d side of the insertion holes 20f, 20g, 20h, 20n, 20o, 20p having the shape of an elongated hole and the coupling holes 12d, 12e, 12f, 12g, 12h, 12i may have any non-circular shape in which the distances r1 to r12 from the centers E1 to E12 of the ends of the insertion holes 20f, 20g, 20h, 20n, 20o, 20p on the rear end 20d side and the coupling holes 12d, 12e, 12f, 12g, 12h, 12i vary in one circumferential direction about the centers E1 to E12.

In the embodiments, as shown in FIGS. 7, 9, and 11, the polygonal coupling holes 12d, 12e, 12f and the polygonal insertion holes 20f, 20g, 20h are positioned so that the vertices of the polygonal coupling hole 12d, 12e, 12f do not match the vertices of the polygonal insertion hole 20f, 20g, 20h in the state where the front ends 20c of the pair of side plate portions 20a, 20b of the sub-bracket 20 overlap the rear ends 12c of the pair of side plates 12a, 12b of the main bracket 12. However, the polygonal coupling holes 12d, 12e, 12f and the polygonal insertion holes 20f, 20g, 20h may be positioned so that the vertices of the coupling hole 12d, 12e, 12f match the vertices of the insertion hole 20f, 20g, 20h. That is, the coupling holes 12d, 12e, 12f and the insertion holes 20f, 20g, 20h which are formed in the main bracket 12 and the sub-bracket 20 function as the stoppers regardless of whether or not the vertices of the coupling hole 12d, 12e, 12f match the vertices of the insertion hole 20f, 20g, 20h when the sub-bracket 20 is attached to the main bracket 12. Accordingly, positioning of the holes need not be considered when forming the holes and when attaching the sub-bracket 20 to the main bracket 12. The use of the polygonal holes therefore does not affect workability.

In the first to third embodiments and the sixth to eighth embodiments, the insertion holes 20f, 20g, 20h, 20n, 20o, 20p other than the ends on the rear end 20d side have the shape of an elongated hole so as to allow the clinching portions 22b of the second clinching pin 22 to pass therethrough. However, the insertion holes 20q, 20s, 20u other than the ends on the rear end 20d side may have any shape such as, e.g., a trapezoidal shape or a circular shape like the insertion holes 20q, 20s of the ninth and tenth embodiments, as long as the clinching portions 22b of the second clinching pin 22 can pass therethrough. Like the insertion holes 20u of the eleventh embodiment, the insertion holes need not necessarily have a portion that allows the clinching portions 22b of the second clinching pin 22 to pass therethrough as in the ninth and tenth embodiments.

In the embodiments, as shown in FIG. 7, positioning is performed with, e.g., a jig etc. so that the center E2 of the end of the insertion hole 20f on the rear end 20d side, the center E1 of the coupling hole 12d, and the axis G of the clinching portion 22b of the second clinching pin 22 match each other in position. However, positioning need not necessarily be performed with a jig etc. so that the center E2 of the insertion hole 20f, the center E1 of the coupling hole 12d, and the axis G of the clinching portion 22b match each other in position. For example, if the clinching portions 22b are clinched with the axis G of the clinching portion 22b being shifted from the center E2 of the insertion hole 20f and the center E1 of the coupling hole 12d, the clinched clinching portions 22b expand toward the inner peripheral surfaces of the coupling holes 12d and the insertion holes 20f. The second clinching pin 22 thus moves so that the axis G of the clinching portion 22b matches the center E2 of the insertion hole 20f and the center E1 of the coupling hole 12d.

In the embodiments, the coupling holes 12d have substantially the same diameter as the ends of the insertion holes 20f on the rear end 20d side. However, for example, the coupling holes 12d may have a smaller diameter than the ends of the insertion holes 20f on the rear end 20d side.

Although not illustrated individually, the present invention can be carried out in various modified or improved forms based on the knowledge of those skilled in the art.

NOMENCLATURE OF ELEMENTS 10, 30: brake pedal device (vehicle pedal device) 11: dash panel 12: main bracket 12a, 12b: side plates 12c: rear ends 12d: coupling hole 16: brake pedal (pedal) 19: instrument panel reinforcement 20: sub-bracket 20a, 20b: side plate portions 20c: front ends 20d: rear ends 20f, 20g, 20h, 20n, 20o, 20p, 20q, 20s, 20u: insertion hole (elongated hole) 22: second clinching pin (clinching pin) 22b: clinching portions (both ends) 24: pivot lever

The invention claimed is:

1. A vehicle pedal device, including a main bracket that comprises a pair of side plates pivotally supporting a pedal and that is attached to a dash panel, and a sub-bracket that couples a rear end of the main bracket and an instrument panel reinforcement, and in which in a state where both ends of a clinching pin inserted through coupling holes formed in rear ends of the pair of side plates are inserted through insertion holes formed in front ends of a pair of side plate portions of the sub-bracket, the both ends of the clinching pin are compressed in an axial direction by clinching, whereby the rear ends of the pair of side plates are attached to the pair of side plate portions of the sub-bracket by the clinching such that the pair of side plate portions of the sub-bracket overlap the rear ends of the pair of side plates, inner peripheral edges of the coupling holes and the insertion holes having such a non-circular shape that distances from centers of the coupling holes and the insertion holes vary in one circumferential direction about the centers, the pair of side plate portions being extended outward so as to be separated further away from the pair of side plates toward the dash panel, and the insertion holes formed in the pair of side plate portions having a shape of an elongated hole having such a length that allows the both ends of the clinching pin which protrude from the pair of side plates to pass therethrough in the state where the pair of side plate portions are extended outward.

2. The vehicle pedal device according to claim 1, wherein the clinching pin turnably supports a pivot lever that, when the dash panel moves backward and the sub-bracket is caused to pivot with respect to the main bracket about the clinching pin, pivots together with the sub-bracket to cause the pedal to pivot in a direction in which the pedal is operated.

3. The vehicle pedal device according claim 1, wherein a rear end of the sub-bracket is located higher than the insertion holes formed in the front ends of the sub-bracket.

* * * * *